Jan. 16, 1923.
W. H. ROSE.
APPARATUS FOR BRINGING GASES IN CONTACT WITH LIQUIDS.
FILED NOV. 26, 1920.
1,442,414.
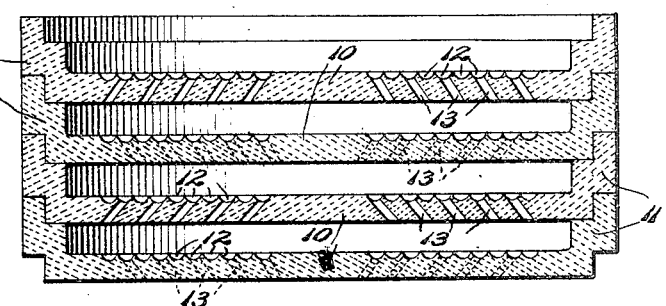
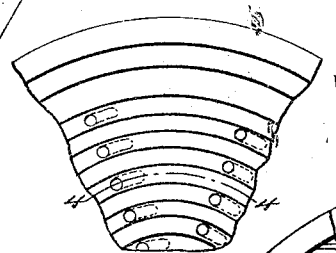
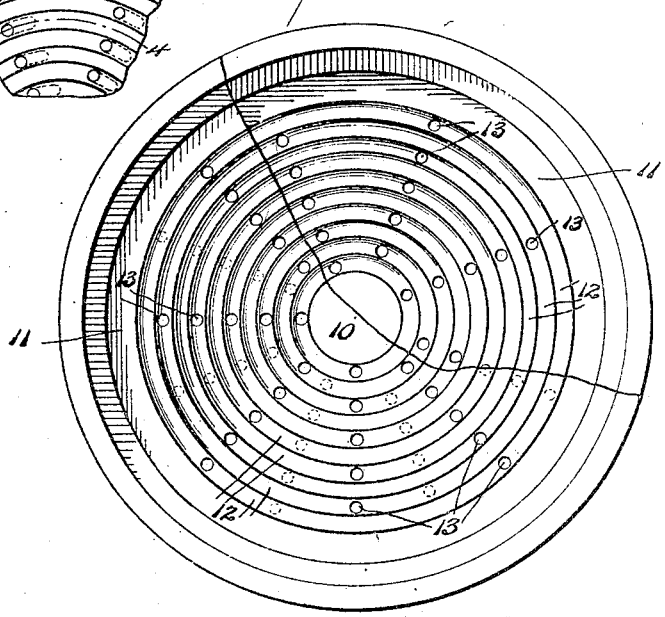
Inventor
W. H. Rose,
By Watson, Coit, Moore & Grindle,
Attys Patented Jan. 16, 1923.

UNITED STATES PATENT OFFICE.

WILLIAM H. ROSE, OF JERSEY CITY, NEW JERSEY.

APPARATUS FOR BRINGING GASES IN CONTACT WITH LIQUIDS.

Application filed November 26, 1920. Serial No. 426,579.

*To all whom it may concern:*

Be it known that I, WILLIAM H. ROSE, a citizen of the United States, and residing at Jersey City, Hudson County, State of New Jersey, have invented certain new and useful Improvements in Apparatus for Bringing Gases in Contact with Liquids, of which the following is a specification.

This invention relates to an apparatus for bringing gases into intimate contact with liquids in chemical processes and its object is to provide an apparatus of this character which is adapted to secure a more intimate contact between the fluids than has been obtainable in similar apparatus heretofore designed or suggested.

In the patent to George Lunge, 344,322 of June 22, 1886, an apparatus for bringing gases into intimate contact with liquid in conformity with the well known requirements of many operations of industrial chemistry is shown, and my present invention consists in an improvement upon the invention disclosed in the patent mentioned. One embodiment of the invention is disclosed in the following description when taken with the accompanying drawings in which:

Figure 1 is a central vertical section through a group of superposed plates forming part of a unit for mixing gases and liquids;

Figure 2 is a plan view of the same, the top plate being broken away to show the plate below.

Figure 3 is a plan view of a fragment of a modified form of plate, and

Figure 4 is a section on line 4—4 of Figure 3.

The several plates are preferably of stoneware, earthen ware, or other vitreous material which will not be chemically acted upon by strong acids or other chemicals which may pass through the apparatus. Each plate has a flat main portion 10 and a circular rim 11 which is so formed that the plates may be stacked, as shown in Figure 10, while leakage of gas through the joints between the plates is practically prevented. The plate rims 11 may be formed in various ways for this purpose but I have found that rims formed as illustrated are quite satisfactory. Each of the plates is provided on its upper surface with a plurality of annular grooves 12 and each plate is also provided with a plurality of inclined passageways 12 leading from the bottoms of the grooves to the underside of the plate, these passageways serving to permit the downward flow of liquid through the plate and the simultaneous upward flow of gas.

It will be seen from an inspection of Figure 1 that the corresponding passages 13 of alternate plates of the series are reversely inclined, that is, the passages 13 of the uppermost plate are upwardly inclined toward the center of the plate while the passages of the next plate below are upwardly inclined away from the center of the plate and so on. The passages in each plate are arranged in radial rows at angles of substantially 45° from each other and in each row there is a passage leading downwardly from the bottom of each alternate groove. It may also be seen that in each radial row of passages each individual passage leads from the bottom of a groove which has no similar passage in either of the adjacent radial rows of fluid passages.

Furthermore, the lower end of each passage is disposed vertically above and is adapted to discharge fluid into an annular groove in the plate below at a point equidistant from two passages 13. The object in arranging the grooves and passages in the manner set forth is to secure the greatest possible intermixture of the gases and liquids as they pass through the apparatus, this object being realized by causing the fluid to take an extremely circuitous path in passing downwardly and by causing the gases passing upwardly therethrough to be broken into many small streams which are alternately thrown toward the center of the column and away from the center, thereby causing eddy currents between the plates. The gases of course pass upwardly through the staggered rows of openings 13 and come in contact with the fluid not only as it lies on the tops of the plates in the grooves provided, but as it flows downwardly through the various openings and drops to the plates below. The alternate plates are similarly formed and in assembling a column of the plates, they are so placed that the rows of holes of one plate lie intermediate the radial rows of openings in the plates above and below it, as before explained and illustrated in Figure 2.

In Figures 3 and 4 a modified form of plate is illustrated in which the passages are inclined circumferentially instead of toward or away from the axis of the plate. This form of plate may be found more advantageous in use under certain circumstances than the form illustrated in Figures 1 and 2. The radial rows of holes in the superposed plates will be staggered, in the assembled apparatus, as when the first described form is used.

Slight changes may be made if desired in the exact design of the plates and arrangement of the holes within the scope of the invention, which is not limited to the exact embodiment illustrated and described.

Having thus described the invention what is claimed as new and desired to be secured by Letters Patent is:—

1. In an apparatus for treating gases with liquids, in combination, a plurality of spaced superposed plates, each plate being provided with a plurality of depressions formed in its upper surface and a plurality of inclined passages therethrough for gas and liquid, said passages leading from the bottoms of said grooves to the underside of the plate.

2. In an apparatus for treating gases with liquids, in combination, a plurality of spaced superposed plates, each plate being provided with concentric grooves in its upper surface and a plurality of inclined passages therethrough for gas and liquid, said passages leading from the bottoms of said grooves to the underside of the plate.

3. In an apparatus for treating gases with liquids, in combination, a plurality of spaced superposed plates, each plate having a series of concentric grooves in its upper surface and a plurality of passages leading from the bottoms of the grooves to the underside of the plate, the lower end of each of said passages being vertically above a groove in the plate below but out of vertical alignment with a passage leading from the bottom of said lower groove to the underside of the lower plate.

4. In an apparatus for treating gases with liquids, in combination, a plurality of spaced superposed plates, each plate having a series of concentric grooves in its upper surface and a plurality of passages leading from the bottoms of the grooves to the underside of the plate, said passages being arranged in radial rows and the radial rows of passages of each plate being spaced horizontally from the radial rows of passages of the plates immediately above and below the same.

In testimony whereof I affix my signature.

WILLIAM H. ROSE.